US009695699B2

(12) United States Patent
Pernleitner et al.

(10) Patent No.: US 9,695,699 B2
(45) Date of Patent: Jul. 4, 2017

(54) SECURING BLADE ASSORTMENT

(71) Applicant: MTU Aero Engines AG, Munich (DE)

(72) Inventors: Martin Pernleitner, Dachau (DE); Rudolf Stanka, Rattenkirchen (DE); Manfred Schill, Munich (DE)

(73) Assignee: MTU Aero Engines AG, Munich (DE)

( * ) Notice: Subject to any disclaimer, the term of this patent is extended or adjusted under 35 U.S.C. 154(b) by 465 days.

(21) Appl. No.: 14/248,067

(22) Filed: Apr. 8, 2014

(65) Prior Publication Data

US 2014/0301853 A1 Oct. 9, 2014

(30) Foreign Application Priority Data

Apr. 9, 2013 (EP) .................................... 13162839

(51) Int. Cl.
*B64C 11/04* (2006.01)
*F01D 5/32* (2006.01)

(52) U.S. Cl.
CPC ............... *F01D 5/32* (2013.01); *F01D 5/323* (2013.01); *F05D 2230/60* (2013.01)

(58) Field of Classification Search
CPC ... F01D 5/32; F01D 5/30; F01D 5/323; F05D 2230/60
USPC ...................................................... 416/220 R
See application file for complete search history.

(56) References Cited

U.S. PATENT DOCUMENTS

| | | | | |
|---|---|---|---|---|
| 2,761,648 A * | 9/1956 | Thompson | F01D 5/323 | 29/509 |
| 2,994,507 A * | 8/1961 | Keller | F01D 5/326 | 416/193 A |
| 3,076,634 A | 2/1963 | Boyle et al. | | |
| 3,248,081 A * | 4/1966 | Bobo | F01D 5/323 | 416/191 |
| 4,846,628 A * | 7/1989 | Antonellis | F01D 11/006 | 416/220 R |
| 5,350,279 A * | 9/1994 | Prentice | F01D 5/323 | 416/220 R |
| 5,425,621 A * | 6/1995 | Maar | F01D 5/027 | 416/144 |
| 5,584,659 A * | 12/1996 | Schmidt | F01D 5/027 | 416/144 |
| 7,806,662 B2 * | 10/2010 | Gekht | F01D 5/323 | 416/221 |
| 8,535,012 B2 * | 9/2013 | Schlosser | F01D 5/323 | 416/204 A |

FOREIGN PATENT DOCUMENTS

| | | | |
|---|---|---|---|
| GB | 691 380 | 5/1953 | |
| GB | 1213408 A * | 11/1970 | F01D 5/323 |
| GB | 2 408 296 | 5/2005 | |

* cited by examiner

*Primary Examiner* — Jessica Cahill
(74) *Attorney, Agent, or Firm* — Davidson, Davidson & Kappel, LLC

(57) ABSTRACT

A securing plate assortment including multiple different securing plates, the securing plates having different geometric codings. A turbine and method is also disclosed.

14 Claims, 2 Drawing Sheets

SECURING BLADE ASSORTMENT

This claims the benefit of European Patent Application EP 13 162 839.8, filed Apr. 9, 2013 and hereby incorporated by reference herein.

The present invention relates to a securing plate assortment for a blade assembly of a gas turbine having multiple different securing plates, to a gas turbine having such a securing plate assortment, and to a method for assembling such a blade assembly.

BACKGROUND

Known gas turbines frequently include different turbine stages, in each of which moving blades are fixed to a turbine disk with the aid of securing plates. A corresponding device for securing moving blades is shown, among other things, in EP 0 610 668 A1, related to U.S. Pat. No. 5,425,621, which is hereby incorporated by reference herein.

It may occur in gas turbines having multiple turbine stages that securing plates, which differ marginally in their function-related dimensions, are installed due to the different axial widths of individual turbine stages and/or due to the different design of the moving blades. Such an assortment of only slightly different securing plates, which are difficult to distinguish from each other with the naked eye, may result in increased proneness to errors during assembly.

SUMMARY OF THE INVENTION

It is an object of the present invention to improve the assembly of moving blade assemblies using securing plates.

The present invention provides, a securing plate assortment includes multiple different securing plates, different securing plates having different geometric codings.

In this way, it is advantageously achievable in one embodiment that different securing plates are assignable to the associated blade assembly with a lower error rate, or free of errors, during assembly of the gas turbine. In particular an advantageous increase in safety is thus also achievable.

According to one preferred refinement of the present invention, the geometric codings differ in terms of the number and/or shape and/or size of recesses and/or elevations, which are axial and/or radial, in particular with regard to the assembled condition.

In one embodiment, a haptic and/or low-wear distinction between the different securing plates is thus advantageously made possible. Moreover, in one embodiment a visual distinction between the different securing plates may advantageously be made possible. In addition or as an alternative, an assembly process is at least partially automatable using such a geometric coding.

A coding may have one, two or multiple recesses and/or elevations. The recesses may differ in their shape; in particular, different codings may alternatively have round holes, grooves, notches and/or similar recesses. The elevations may also differ in their shape; it is possible to provide webs, pins and/or similar elevations. In addition or as an alternative, elevations and/or recesses may have maximal dimensions, such as diameters, which differ by at least 5 mm, in particular at least 10 mm. In addition or as an alternative, elevations and/or recesses of different securing plates may be situated in different locations of the securing plates, for example, offset in the circumferential direction (with regard to the mounting site).

According to one preferred refinement, the securing plates have a functional area for supporting or securing the blade assembly and a coding area, the geometric coding of the securing plates being situated in the coding area.

In this way, it is advantageously possible in one embodiment to ensure that the coding of the securing plates does not influence, or only slightly influences, the function of the securing plate and/or the function of the turbine component to be secured.

Presently, a functional area shall be understood to mean in particular an area of the securing plate which limits, in particular prevents, an undesirable, in particular axial, movement of the blade assembly, in particular with the aid of form-locked and/or frictionally engaged contact with the blade assembly to be secured.

A coding area shall presently be understood to mean in particular an area of the securing plate in which different recesses and/or elevations are provided, which in their combination represent the geometric coding of the securing plate.

It is also possible within the scope of the present invention that the geometric coding of the securing plate is formed by a combination of recesses and/or elevations of at least two coding areas.

According to one preferred refinement, the securing plates have a first flange, a second flange and a connecting web. At least one of the flanges and/or the connecting web has/have a functional area which is designed differently than a functional area of the other securing plates.

In particular, it may be provided that the connecting webs of different securing plates have different longitudinal extensions and/or widths.

A longitudinal extension of a securing plate within the sense of this refinement shall be understood to mean in particular the axial extension, relative to the gas turbine, in the assembled state. In one embodiment, the longitudinal extensions of different securing plates of the securing plate assortment differ at most by 10 mm, in particular at most by 1 mm, which is difficult to distinguish with the naked eye in the assembled situation.

According to one preferred refinement, the first flange and/or the second flange of the securing plates has/have at least one coding area, in particular in each case. In one embodiment, this coding area may be situated on a surface of the flange facing the blade assembly, on a surface of the flange facing away from the blade assembly and/or on an edge of the flange joining these two surfaces.

In this way, in one embodiment a geometric coding may advantageously be situated in an area of the securing plate which is close to the end, and accessible or visible even in the assembled state, whereby in particular a better haptic distinction between the different or differently coded securing plates is possible.

According to one preferred refinement, the connecting web of the securing plates additionally or alternatively has a coding area. In this way, in particular an improved visual distinction between the different securing plates prior to or during assembly is advantageously made possible, and a larger space is usable for coding.

According to one preferred refinement, different securing plates have coding areas which are situated so as to correspond to each other and whose codings differ in terms of the number and/or shape and/or size of recesses.

In this way, it is advantageously achievable in one embodiment that different securing plates are easier to distinguish from each other during assembly since the assembler always checks the same coding area. In one embodiment, simpler automated checking of mounted securing plates is also advantageously achievable.

According to one preferred refinement, the coding area is situated differently from the functional area, in particular spaced apart from it.

In this way, it is advantageously achievable in one embodiment that the coding of the securing plates is still checkable even in the assembled state.

According to one further aspect of the present invention, a gas turbine includes at least two, in particular multiple, turbine stages, different securing plates, which are designed to be distinguishable based on their coding area, being situated on the different turbine stages.

In this way, it is in particular advantageously achievable that the appropriate securing plates are positionable in a simple and/or less error-prone manner during the assembly of every turbine stage.

According to one further aspect of the present invention, a method for assembling blade assemblies of a gas turbine includes the following steps:

- assigning one securing plate in each case from a securing plate assortment including different securing plates having different geometric coding to different blade assemblies;
- joining these blade assemblies to the turbine; and
- selecting securing plates based on their geometric coding and joining these to the assigned blade assembly.

In this way, it is in particular advantageously achievable that different securing plates are assignable to the associated blade assembly with a lower error rate, or free of errors, during assembly of the gas turbine. In this way, in particular an advantageous reduction of the error rate during assembly is also achievable.

According to one preferred refinement of the method, the following steps are provided:

- assigning securing plates having different geometric coding to different mounting sites on the turbine; and
- selecting securing plates based on their geometric coding and joining these to the assigned mounting site on the turbine.

In this way, in particular an advantageous reduction of the error rate during assembly is achievable.

According to one preferred refinement of the method, prior to geometrically fixing the blade assembly and securing plate with respect to each other, it is checked whether a securing plate which is assigned to this blade assembly was mounted.

In one embodiment, first the securing plate and blade assemblies are mounted on a turbine stage, the blade assemblies and the securing plate not being fixed with respect to each other yet. This fixation may take place in particular by deforming, in particular bending a flange of, the securing plate.

Until the fixation has taken place, it is checked whether a securing plate which is assigned to the installed blade assemblies was mounted.

In this way, it is advantageously possible in particular to further reduce the error rate during assembly.

According to one preferred refinement of the method in which the gas turbine includes at least two, in particular multiple, turbine stages, a securing plate of the securing plate assortment is assigned to each turbine stage.

In this way, it is advantageously achievable in particular that the appropriate securing plates are positionable in a simple and/or less error-prone manner during the assembly of every turbine stage.

BRIEF DESCRIPTION OF THE DRAWING

Further advantageous refinements of the present invention are derived from the subclaims and the following description of preferred embodiments, showing a partially schematic illustration.

DETAILED DESCRIPTION

Figure 1:
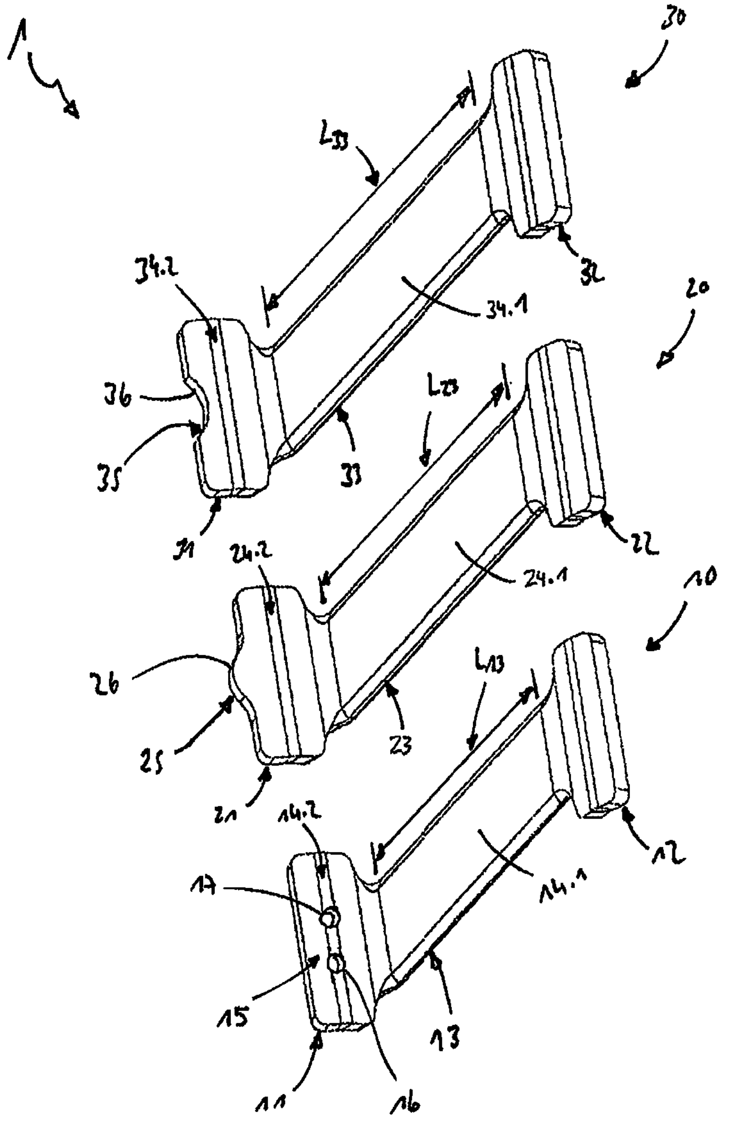
FIG. 1 shows a securing plate assortment designed according to one embodiment of the present invention, including three different securing plates.

FIG. 1 shows a securing plate assortment 1 designed according to one embodiment of the present invention including a plurality of different securing plates 10, 20 and 30.

Securing plates 10, 20, 30 in each case have a first flange 11, 21, 31 and a second flange 12, 22, 32. On each securing plate 10, 20, 30, first flange 11, 21, 31 is joined to second flange 12, 22, 32 with the aid of a connecting web 13, 23, 33.

These connecting webs 13, 23, 33 marginally differ in their longitudinal extension $L_{13}$, $L_{23}$, $L_{33}$, whereby securing plates 10, 20, 30 also have different longitudinal extensions.

The difference in longitudinal extension $L_{13}$, $L_{23}$, $L_{33}$ of connecting webs 13, 23, 33 is function-related, i.e., due to the corresponding axial extension of the blade assembly to be secured by the securing plates.

Moving blade roots may be in contact with the particular securing plate 10, 20, 30 in the area of longitudinal extension $L_{13}$, $L_{23}$, $L_{33}$ of connecting webs 13, 23, 33; as a result, a functional area 14.1, 24.1, 34.1 of securing plates 10, 20, 30 is situated there in each case.

Functional areas 14.2, 24.2, 34.2 are also situated on first flanges 11, 21, 31, here for axial securing, and are in contact with the moving blade roots.

A coding area 15 is additionally provided on first flange 11 of securing plate 10 in functional area 14.2, a geometric coding of securing plate 10 being formed in this coding area with the aid of two recesses 16 and 17 designed as round holes. No recesses are provided in corresponding area 24.2, 34.2 of securing plates 20, 30, so that securing plate 10, despite its only minor difference in length, is distinguishable from securing plates 20, 30 haptically and in a wear-protected manner and assignable to the particular turbine stage or blade assembly.

Adjoining functional areas 24.2 or 34.2, a coding area 25 or 35 is formed on first flange 21 of securing plate 20 and on first flange 31 of securing plate 30, the coding area being spaced apart from functional areas 24.2 or 34.2 in order to not impair their function, in particular to not weaken the surface.

Coding areas 25 and 35 are situated in mutually corresponding positions of securing plate 20 and 30 in each case. Within the sense of this exemplary embodiment, it may also be provided, contrary to what is shown in FIG. 1, that the coding areas of all securing plates are situated in mutually corresponding positions of the particular securing plate, for example, that axial recesses differing in terms of number, shape and/or positioning are formed in areas 14.2, 24.2 and 34.2 and/or that radial elevations and/or recesses differing in number, shape and/or positioning are formed on the edges (left in FIG. 1).

Coding area 25 of securing plate 20 has a radial elevation 26 (with regard to the assembled condition), which here essentially has the shape of a partial circle. Coding area 35 of securing plate 30 has a radial recess, which here has the shape of a partial circle.

Due to the different positioning, number, shape and/or size of the recesses and elevations in coding area 15, 25, 35 in each case compared to the other coding areas, each securing plate 10, 20, 30 has a different geometric coding.

A geometric coding, as it is shown in FIG. 1, in particular allows a haptic distinction between three securing plates 10, 20 and 30 without wear, which would prove difficult to do for an assembler without this geometric coding due to the only marginally different longitudinal extension $L_{13}$, $L_{23}$, $L_{33}$ of the connecting webs 13, 23, 33.

Figure 2:
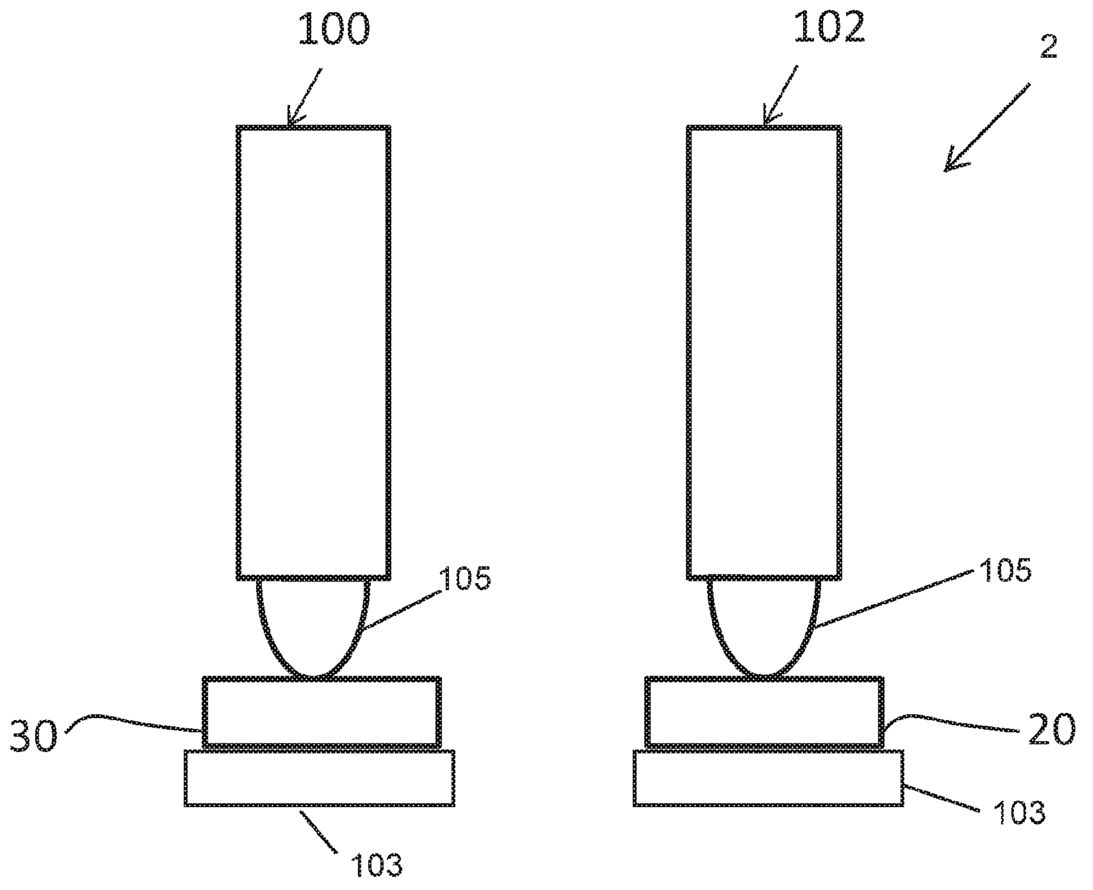
FIG. 2 shows a schematic depiction of a turbine according to the present invention.

FIG. 2 shows schematically a gas turbine 2 with a first turbine stage 100 with securing plates 30 and a second turbine stage 102 with securing plates 20 having different geometric codings than securing plates 30. The securing plates 20 and 30 are shown schematically mounted to blade assemblies 105 and to mounting sites 103.

While the description above explained exemplary embodiments, it shall be pointed out that a plurality of modifications is possible. Moreover, it shall be pointed out that the exemplary embodiments are only examples which are not intended to limit the scope of protection, the applications and the design. Rather, the description above gives those skilled in the art a guideline for implementing at least one exemplary embodiment, various modifications being possible, in particular with respect to the function and positioning of the described components, without departing from the scope of protection as it is derived from the claims and feature combinations equivalent to the claims.

LIST OF REFERENCE NUMERALS

1 securing plate assortment
10, 20, 30 securing plate
11, 21, 31 first flange
12, 22, 32 second flange
13, 23, 33 connecting web
14, 24, 34 functional area
15, 25, 35 coding area
16, 17, 36 recess
26 elevation
100 turbine stage
102 turbine stage
$L_{13}$, $L_{23}$, $L_{33}$ longitudinal extension

What is claimed is:

1. A securing plate assortment for a blade assembly of a gas turbine, comprising:

a plurality of different securing plates, wherein the different securing plates have a first flange, a second flange, and a connecting web, and wherein the different securing plates have respective different geometric codings situated in respective coding areas;

wherein, in each of the different securing plates, the first flange or the second flange has the respective coding area;

and wherein each respective coding area is situated on a first surface of the first or second flange facing away from the blade assembly and/or on an edge joining the first surface with a surface facing the blade assembly; and wherein the different geometric codings include codings on or through the first surface, or codings on the edge.

2. The securing plate assortment as recited in claim 1 wherein the geometric codings differ in terms of number or shape or size of recesses or elevations.

3. The securing plate assortment as recited in claim 1 wherein different securing plates have the respective coding areas situated so as to correspond to each other, whose codings differ in terms of the number or shape or size of recesses or elevations.

4. A gas turbine comprising a securing plate assortment as recited in claim 1 and at least two turbine stages on which different securing plates are situated, each having different geometric codings.

5. The securing plate assortment as recited in claim 1 wherein each of the different securing plates include a functional area for supporting or securing the blade assembly and the respective coding area.

6. The securing plate assortment as recited in claim 5 wherein the respective coding area is situated differently from the functional area.

7. The securing plate assortment as recited in claim 6 wherein the respective coding area is spaced apart from the functional area.

8. The securing plate assortment as recited in claim 1 wherein at least one of the flanges or the connecting web of a first securing plate of the plurality of different securing plates having a functional area designed differently than the corresponding functional area of a second securing plate of the plurality of different securing plates.

9. The securing plate assortment as recited in claim 8 wherein the connecting webs of different securing plates have different longitudinal extensions or widths.

10. The securing plate assortment as recited in claim 8 wherein the connecting web of the first securing plates has a further coding area.

11. A method for assembling a blade assembly of a gas turbine, comprising selecting one of the securing plates from the securing plate assortment as recited in claim 1 based on the geometric coding and joining the selected securing plate to the blade assembly.

12. The method as recited in claim 11 further comprising assigning securing plates having different geometric coding to different mounting sites on the turbine; and joining the selected securing plate to the assigned mounting site on the turbine.

13. The method as recited in claim 11 wherein, prior to joining the blade assembly and securing plate with respect to each other, checking whether a securing plate assigned to the blade assembly was mounted.

14. The method as recited in claim 11 wherein the gas turbine includes at least two turbine stages assigned different securing plates.

* * * * *